(12) United States Patent
Van Beek et al.

(10) Patent No.: US 8,483,489 B2
(45) Date of Patent: Jul. 9, 2013

(54) EDGE BASED TEMPLATE MATCHING

(75) Inventors: Petrus J. L. Van Beek, Camas, WA (US); Chang Yuan, Vancouver, WA (US); Xinyu Xu, Vancouver, WA (US); Xiaofan Feng, Camas, WA (US); Xiaofeng Fan, Billerica, MA (US)

(73) Assignee: Sharp Laboratories of America, Inc., Camas, WA (US)

( * ) Notice: Subject to any disclaimer, the term of this patent is extended or adjusted under 35 U.S.C. 154(b) by 129 days.

(21) Appl. No.: 13/225,271

(22) Filed: Sep. 2, 2011

(65) Prior Publication Data

US 2013/0058582 A1    Mar. 7, 2013

(51) Int. Cl.
*G06K 9/64*    (2006.01)
(52) U.S. Cl.
USPC .............................. 382/217; 382/103; 382/298
(58) Field of Classification Search
None
See application file for complete search history.

(56) References Cited

U.S. PATENT DOCUMENTS

| | | | |
|---|---|---|---|
| 6,842,538 B2 | 1/2005 | Lee et al. | |
| 7,085,418 B2 | 8/2006 | Kaneko et al. | |
| 7,139,432 B2 | 11/2006 | Wenzel et al. | |
| 7,235,782 B2 | 6/2007 | Takane et al. | |
| 7,492,929 B2 | 2/2009 | Itoh et al. | |
| 7,599,512 B2 | 10/2009 | Shimizu et al. | |
| 7,634,139 B2 | 12/2009 | Yang et al. | |
| 7,636,478 B2 | 12/2009 | Bryll | |
| 7,792,191 B2 | 9/2010 | Kwon | |
| 7,792,192 B2 | 9/2010 | Nagarajan | |
| 2004/0071346 A1 | 4/2004 | Clark et al. | |
| 2005/0169512 A1* | 8/2005 | Fang et al. | 382/141 |
| 2007/0009159 A1 | 1/2007 | Fan | |
| 2008/0166016 A1 | 7/2008 | Sibiryakov et al. | |
| 2010/0098339 A1 | 4/2010 | Kido | |
| 2012/0082385 A1* | 4/2012 | Xu et al. | 382/199 |

FOREIGN PATENT DOCUMENTS

EP    2153379 A    10/2008

OTHER PUBLICATIONS

S. Hinterstoisser et al., "Dominant Orientation Templates for Real-Time Detection of Texture-Less Objects," IEEE Conf. on Computer Vision and Pattern Recognition (CVPR 2010), Jun. 2010, 8 pgs.

* cited by examiner

*Primary Examiner* — Bhavesh Mehta
*Assistant Examiner* — Siamak Harandi
(74) *Attorney, Agent, or Firm* — Chernoff Vilhauer McClung & Stenzel

(57) ABSTRACT

A method for image processing that includes determining edge pixels of a model image using an edge based technique, and an angular orientation for each of the edge pixels of the model image. The method determines a lower spatial resolution model image based upon the model image and determining respective angular orientations for the lower spatial resolution model image. The method determines edge pixels of an input image using an edge based technique, and an angular orientation for each of the edge pixels of the input image. The method determines a lower spatial resolution input image based upon the input image and determining respective angular orientations for the lower spatial resolution input image. The method matches the lower spatial resolution model image with the lower spatial resolution input image to determine candidate locations of an object within the input image and based upon the candidate locations matching the input image with the model image.

21 Claims, 15 Drawing Sheets

TEMPLATE MATCHING model image     example input image     example output image model image     example input image     example output image

100

110

120

140

150

| INDEX | ANGULAR RANGE | BIT PATTERN |
|---|---|---|
| 0 | NON-EDGE | 00000000 |
| 1 | -15 to +15 | 00000010 |
| 2 | +15 to +45 | 00000100 |
| 3 | +45 to +75 | 00001000 |
| 4 | +75 to +105 | 00010000 |
| 5 | +105 to +135 | 00100000 |
| 6 | +135 to +165 | 01000000 |
| 7 | NOT USED | 00000000 |

FIG. 8

| INDEX | ANGULAR RANGE | BIT PATTERN |
|-------|---------------|-------------|
| 0 | NON-EDGE | 00000000 |
| 1 | -15 to +15 | 01000110 |
| 2 | +15 to +45 | 00001110 |
| 3 | +45 to +75 | 00011100 |
| 4 | +75 to +105 | 00111000 |
| 5 | +105 to +135 | 01110000 |
| 6 | +135 to +165 | 01100010 |
| 7 | NOT USED | 00000000 |

FIG. 9

0 DEGREE TEMPLATE

30 DEGREE TEMPLATE

60 DEGREE TEMPLATE

90 DEGREE TEMPLATE

120 DEGREE TEMPLATE

150 DEGREE TEMPLATE

EDGE BASED TEMPLATE MATCHING

CROSS-REFERENCE TO RELATED APPLICATIONS

None.

BACKGROUND OF THE INVENTION

The present invention relates generally to template matching for an image.

Referring to FIG. 1, template matching is a commonly used technique in order to recognize content in an image. The template matching technique includes a given target object in a model image, automatically finding the position, orientation, and scaling of the target object in input images. Generally, the input images undergo geometric transforms (rotation, zoom, etc) and photometric changes (brightness/contrast changes, blur, noise, etc). In the context of template matching, the relevant characteristics of the target object in the model image may be assumed to be known before the template matching to the target image is performed. Such characteristics of the target object may be extracted, modeled, and learned previously in a manner that may be considered "off-line," while the matching of those characteristics to the input image may be considered "on-line."

One of the template matching techniques includes feature point based template matching which achieves good matching accuracy. Feature point based template matching extracts object discriminative interesting points and features from the model and the input images. Then those features are matched between the model image and the input image with K-nearest neighbor search or some feature point classification technique. Next a homography transformation is estimated from those matched feature points, which may further be refined.

Feature point based template matching works well when objects contain a sufficient number of interesting feature points. It typically fails to produce a valid homography when the target object in the input or model image contains few or no interesting points (e.g. corners), or the target object is very simple (e.g. target object consists of only edges, like paper clip) or symmetric, or the target object contains repetitive patterns (e.g. machine screw). In these situations, too many ambiguous matches prevents generating a valid homography. To reduce the likelihood of such failure, global information of the object such as edges, contours, or shape may be utilized instead of merely relying on local features.

Another category of template matching is to search the target object by sliding a window of the reference template in a pixel-by-pixel manner, and computing the degree of similarity between them, where the similarity metric is commonly given by correlation or normalized cross correlation. Pixel-by-pixel template matching is very time-consuming and computationally expensive. For an input image of size N×N and the model image of size W×W, the computational complexity is $O(W^2 \times N^2)$, given that the object orientation in both the input and model image is coincident. When searching for an object with arbitrary orientation, one technique is to do template matching with the model image rotated in every possible orientation, which makes the matching scheme far more computationally expensive. To reduce the computation time, coarse-to-fine, multi-resolution template matching may be used.

What is desired therefore is a computationally efficient edge based matching technique.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 8 illustrates a bit pattern for different angles.

FIG. 9 illustrates another bit pattern for different angles.

DETAILED DESCRIPTION OF PREFERRED EMBODIMENT

Figure 1:
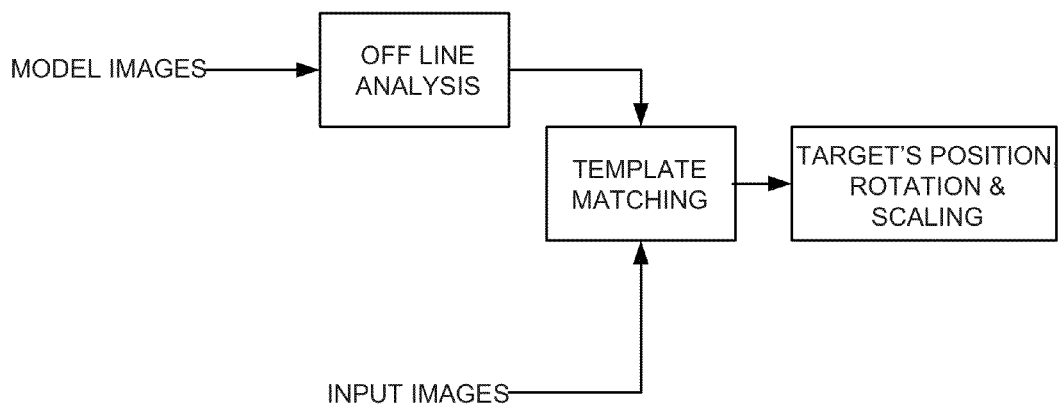
FIG. 1 illustrates template matching.
Figure 2:
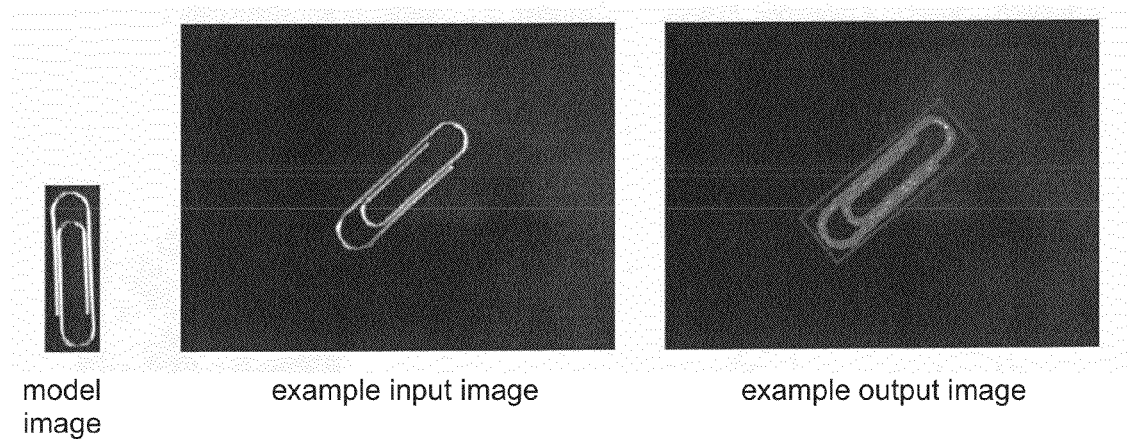
FIG. 2 illustrates a model image, an input image, and an output image.

Referring to FIG. 2, in many cases a model image has a limited set of feature points but tends to have relatively sharp edge features. One such example is a paperclip. Then using a suitable matching technique it is desirable to find a matching object in one or more input images, in a computationally efficient manner. The matching object may be at an unknown position and at an unknown rotation.

Figure 3:
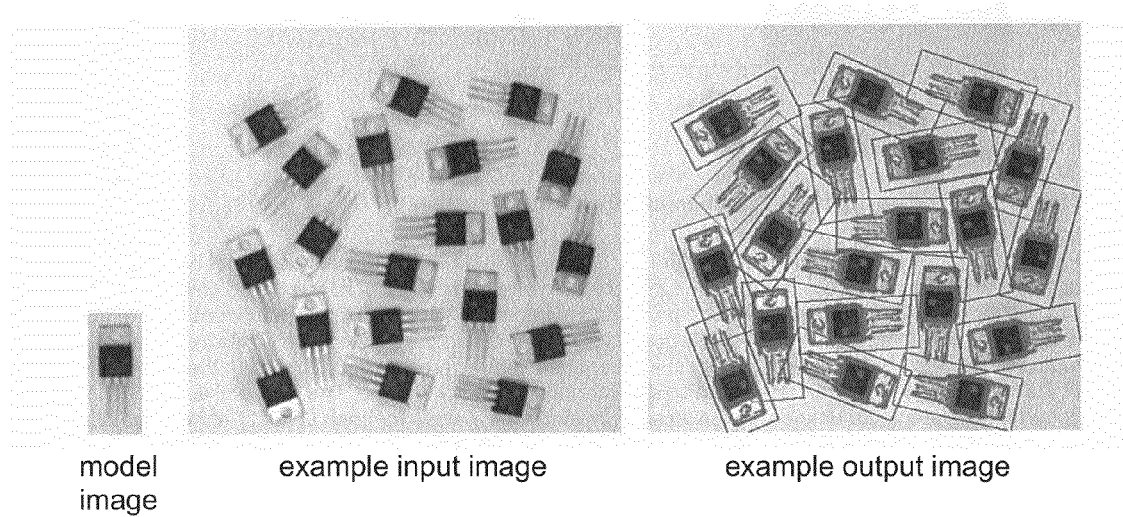
FIG. 3 illustrates another model image, an input image, and an output image.

Referring to FIG. 3, in many cases the input image may have one or more matching objects of interest, which may be overlapping with one another. Then using a suitable matching technique it is desirable to find matching objects in one or more input images, in a computationally efficient manner. The matching objects may be at an unknown position and at an unknown rotation.

Figure 4:
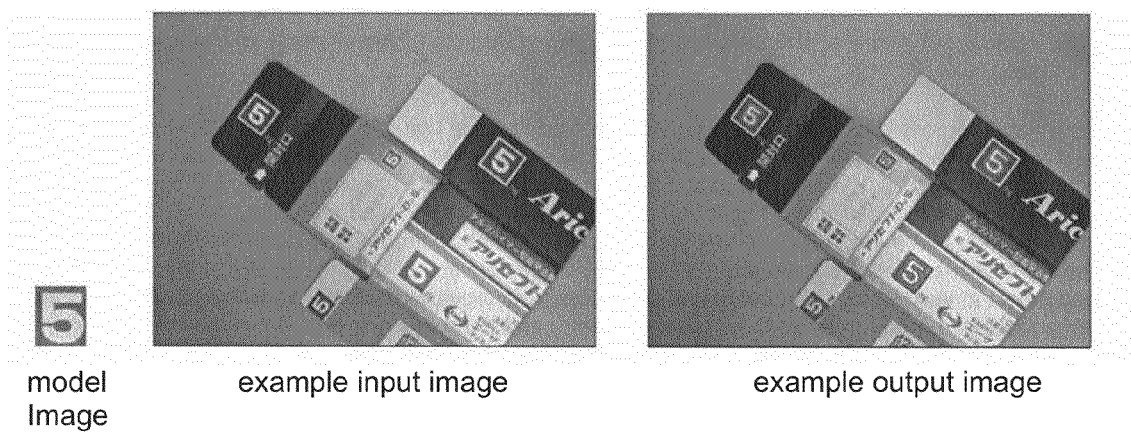
FIG. 4 illustrates another model image, an input image, and an output image.

Referring to FIG. 4, in many cases the input image may have one or more matching objects of interest, which may be overlapping with one another. Then using a suitable matching technique it is desirable to find matching objects in one or more input images, in a computationally efficient manner. The matching object may be at an unknown position, unknown rotation, and unknown scale.

Referring again to FIG. 2, FIG. 3, and FIG. 4, the matching technique should be computationally efficient, while being sufficiently robust to distinguish image features such as sharp corners, significant edges, or distinguish images with relatively few such features. Moreover, the matching technique should be sufficiently robust to reduce effects due to lighting or illumination changes in the image, blur in the image, noise in the image, and other imaging imperfections. Also, the matching technique should be sufficiently robust to be tolerant to partial occlusions of the object or missing parts of the object in the input image.

Figure 5:
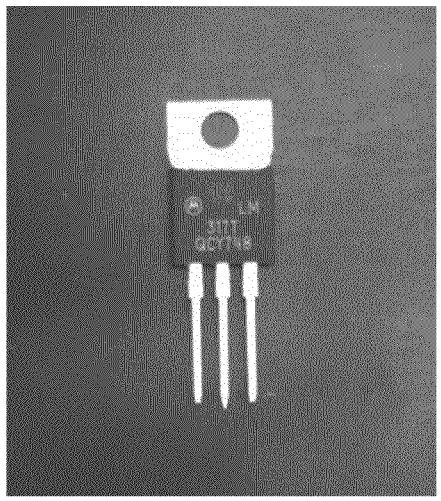
FIG. 5 illustrates an image matching technique.
Figure 5:
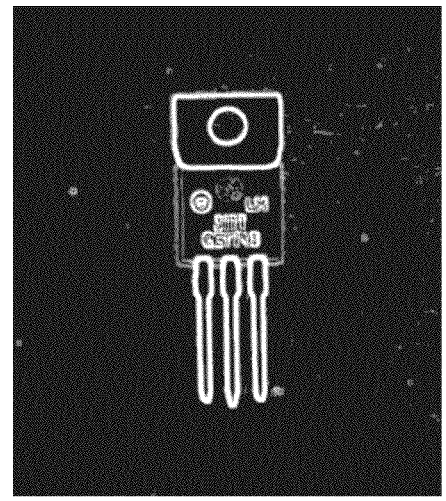
Figure 5:
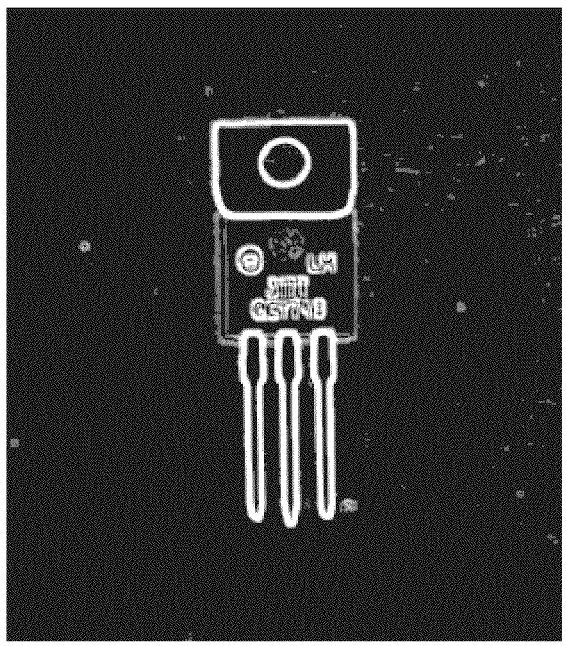
Figure 5:
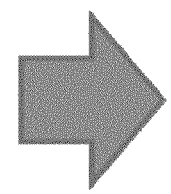
Figure 5:

Referring to FIG. 5, a model image 100 may be received by the system. A preferred technique to determine regions of the model image 100 that are likely to be of interest for image matching is to use an edge based technique 110 to locate edges of the model image. For example, one way to determine the edges 110 is to use a gradient based technique. Edge based techniques are generally robust, generally invariant to lighting changes, generally invariant to illumination changes, generally noise resistant, and generally may be implemented in a computationally efficient manner. For each of the pixels determined to be an edge pixel, the orientation of the edge 120 may be determined. For example, the orientation 120 at each edge pixel may be determined to have an orientation from 0 to 179 degrees (e.g., less than 360 degrees), such as in one degree increments. The orientation may be a full 360 degrees, if desired. The edge orientation 120 therefore preferably includes information regarding the alignment of the edge, but not its particular direction. To increase the invariance of the technique, the edge orientation 120 is preferably defined in a range of generally 180 degrees (e.g., less than 360 degrees). In this manner, the direction of an edge may be either in one direction (e.g., north) or the opposite direction (e.g., south), but the system is agnostic as to which particular direction. This manner of edge orientation characterization results in a system that is more invariant to contrast inversions.

A pixel resolution template 140 may be determined based upon the edge orientations 120. The pixel resolution template 140 may have 180 degrees of angular information at one degree increments (or some other suitable angular increment) at each of the edge pixel locations. Processing input images based only upon the "high resolution" pixel resolution template is computationally inefficient due to the high angular resolution and the high spatial resolution of the pixel resolution template. To increase the computational efficiency of the system, one or more additional quantized angular templates and/or spatial templates based upon the pixel resolution template 140 are preferably utilized.

Figure 6:
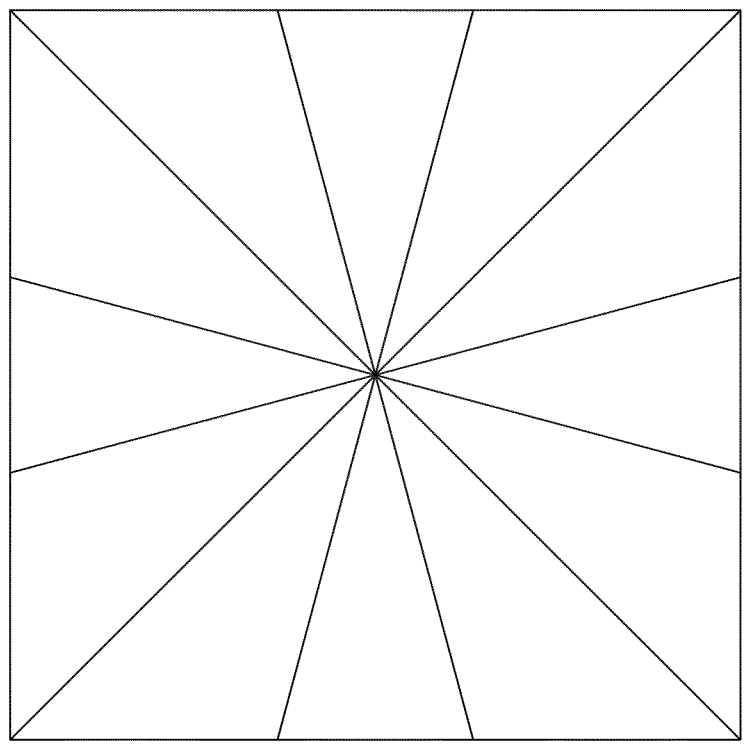
FIG. 6 illustrates a plurality of angular orientations.

Referring to FIG. 6, the edge orientations 120 may be quantized, such as, for example, into one of a set of six orientations, such as −15 to +15 degrees, +15 to +45 degrees, +45 to +75 degrees, +75 to +105 degrees, +105 to +135 degrees, and +135 to +165 degrees. The other opposing six orientations may not need to be determined because the system is preferably directionally invariant. Accordingly, each pixel of the pixel template 140 may be categorized as being within one of the six orientations forming an overall lower angular resolution template 150.

Figure 7:
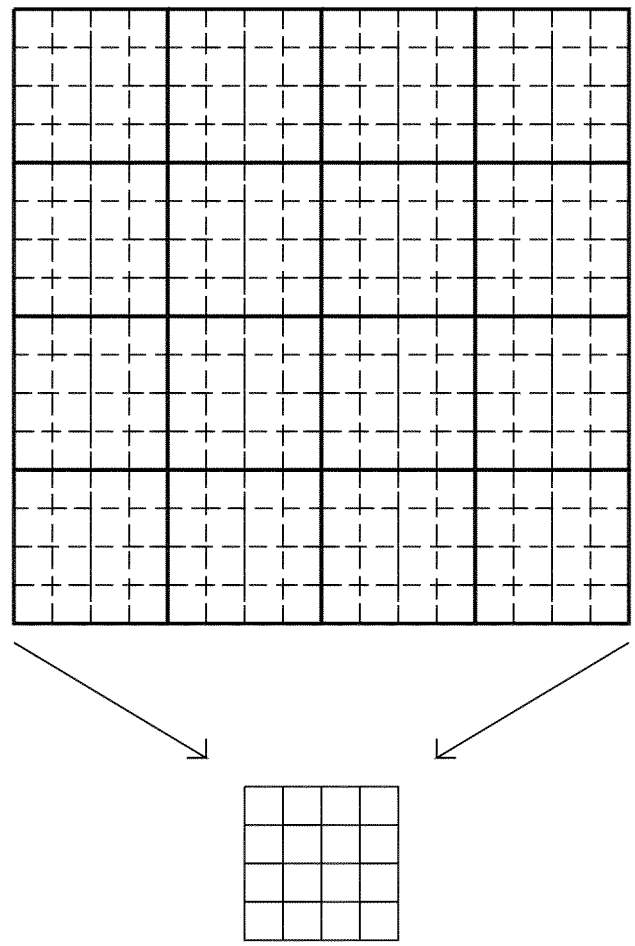
FIG. 7 illustrates pixel blocks of an image.

Referring to FIG. 7, to further increase the computational efficiency of the system, a lower spatial resolution template based upon the lower angular resolution template 150 may be defined by combing groups of pixels, including their angular orientations, into a combined angular direction at a lower resolution. The lower angular resolution template 150 may be modified in a manner to provide lower spatial resolution. For example, each block of 4×4 pixels of the lower angular resolution template may be combined to indicate a single direction and/or multiple directions. For each block of pixels, the frequency of the occurrence of each orientation may be arranged in a rank order. As an alternative, the orientations of the pixels in a block may be arranged in a rank order based on their associated edge strength and/or gradient magnitude. Then the top four occurrences (or other suitable number) of the ranked orientations may be selected as those orientations representative of those in the block. For example, if there are four different orientations then each of them may be selected. For example, if there are three orientations that are the same and a fourth orientation that is different, then the representative orientations may be the two different orientations. Likewise, the edge strength and/or gradient magnitude may be used as a basis for ranking. Other than being used as a basis of ranking to select the orientations, the frequency of the orientations (number of pixels having the same quantized orientation) is preferably not represented in the lower spatial resolution template.

Referring to FIG. 8, to further increase the computational efficiency, the template may be encoded using a set of bytes, with bits of each byte being representative of an angular orientation. For example, the first bit may be representative of a first angular orientation of the six orientations. For example, the second bit may be representative of a second angular orientation of the six orientations. For example, the third bit may be representative of a third angular orientation of the six orientations. For example, the fourth bit may be representative of a fourth angular orientation of the six orientations. For example, the fifth bit may be representative of a fifth angular orientation of the six orientations. For example, the sixth bit may be representative of a sixth angular orientation of the six orientations. As previously noted, the angular orientations are preferably offset from horizontal and vertical, such as −15 degrees to +15 degrees, +15 degrees to +45 degrees, +45 degrees to +75 degrees, +75 degrees to +105 degrees, +105 degrees to +135 degrees, and +135 degrees to +165 degrees. Often the angular orientation of the object within the input image tends to have either vertical and/or horizontal edges, and generally centering those horizontal and/or vertical angular relationships within a range of angles (e.g., −15 to +15) tends to make the system more robust to slight angular modifications. With the potential angular relationships of groups of pixels being represented by bytes, the system can perform computationally efficient pattern matching.

Referring to FIG. 9, in some cases it is desirable to include more robustness in the orientation of the angular determination for a particular pixel to reduce the effects of compared angles being on opposing sides of the quantized angular boundaries. For example, the model image may have an angle of 44 degree (bit pattern 00000100). However, the input image may have a local orientation angle of the same part of the object that was 46 degrees due to noise or other small changes. Then the angle of the input image would be quantized and given a bit pattern of 00001000. The angle codes would not match one another, even though there was only a very small difference in the orientation angle. In such cases with minor variations in the angle, the orientation of the angular determination between an input image and a model template may appear to be significant, while possibly only being different by a couple of degrees (e.g., 44 degrees and 46 degrees). To reduce this likelihood, the bit patterns of the model template may be broadened to include adjoining angular regions. Accordingly, if the bit pattern of the model image was modified to include both sides of the quantized region, namely, 00001110, then the pixel region of the input image having a bit pattern of 00001000 would have overlap and thus be matched. In this manner, the matching would be more robust, although slightly less discriminative. This approach may be refined and extended using additional bit patterns. In particular, a bit pattern may be broadened on only one side of the quantized region, instead of both sides. Furthermore, the decision to broaden a bit pattern may be based on the proximity of the actual orientation angle to the quantization boundary.

Figure 10:
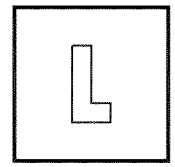
FIG. 10 illustrates a plurality of templates at different rotations.
Figure 10:
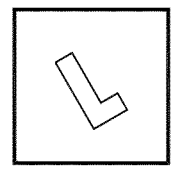
Figure 10:
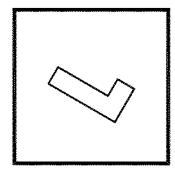
Figure 10:
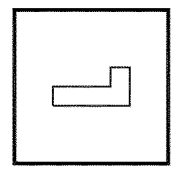
Figure 10:
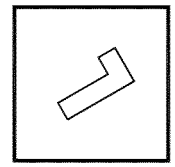
Figure 10:
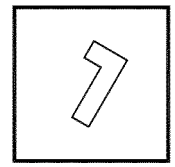

Referring to FIG. 10, to increase the computational efficiency of the system for input images that have objects therein that are at different angular orientations, the model image may be rotated to a plurality of different orientations. The templates are computed at each of the different angular orientations. In this manner, each of the templates for a particular model image may be pre-computed in an efficient manner. For example, the angular positions may include 0 degrees, 30 degrees, 60 degrees, 90 degrees, 120 degrees, and/or 150 degrees. In this manner, an input image to the system to be processed may be compared against a variety of pre-computed lower spatial resolution templates, and in particular, angularly quantized low resolution templates.

Figure 11:
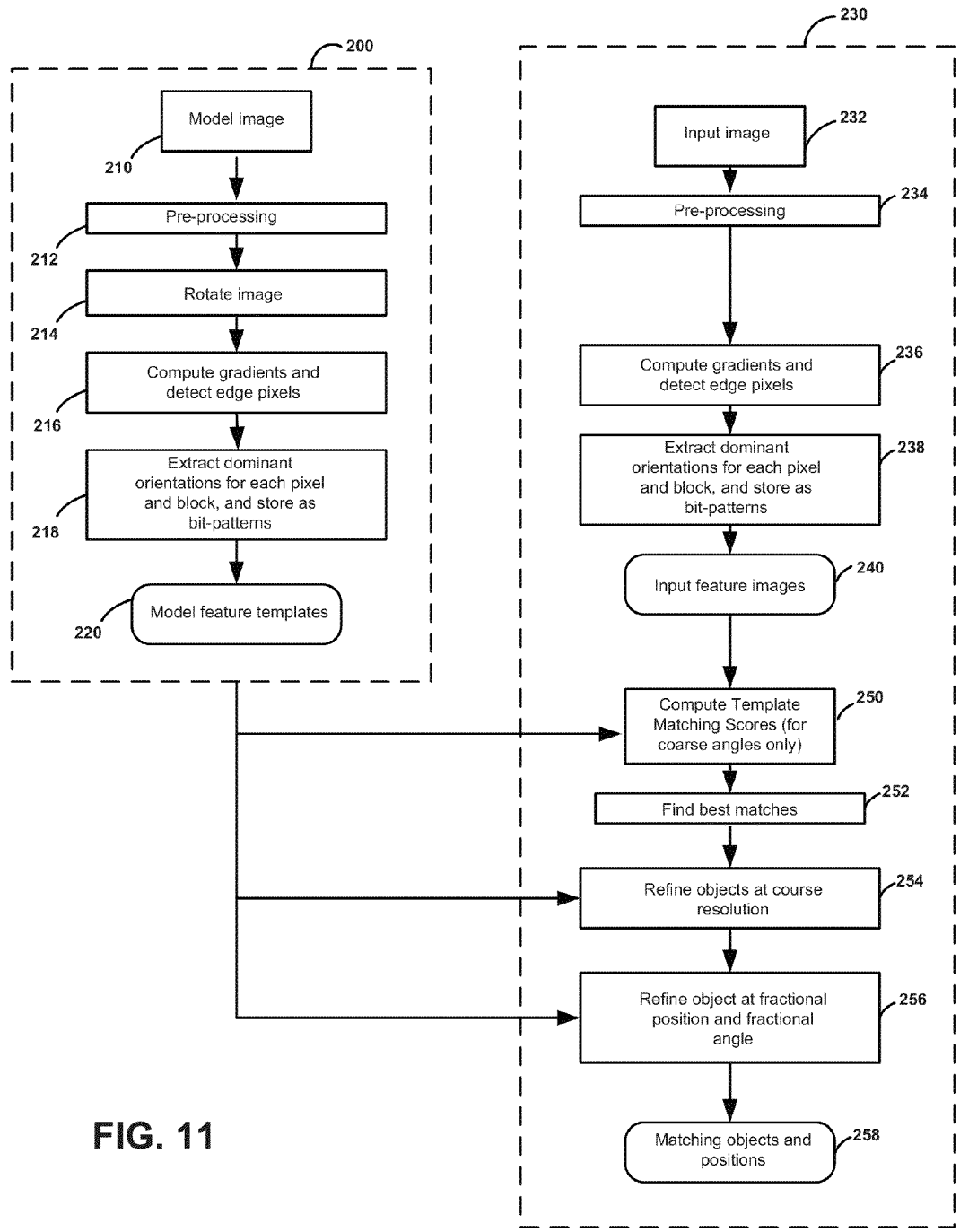
FIG. 11 illustrates an image processing technique for matching.
Figure 12:
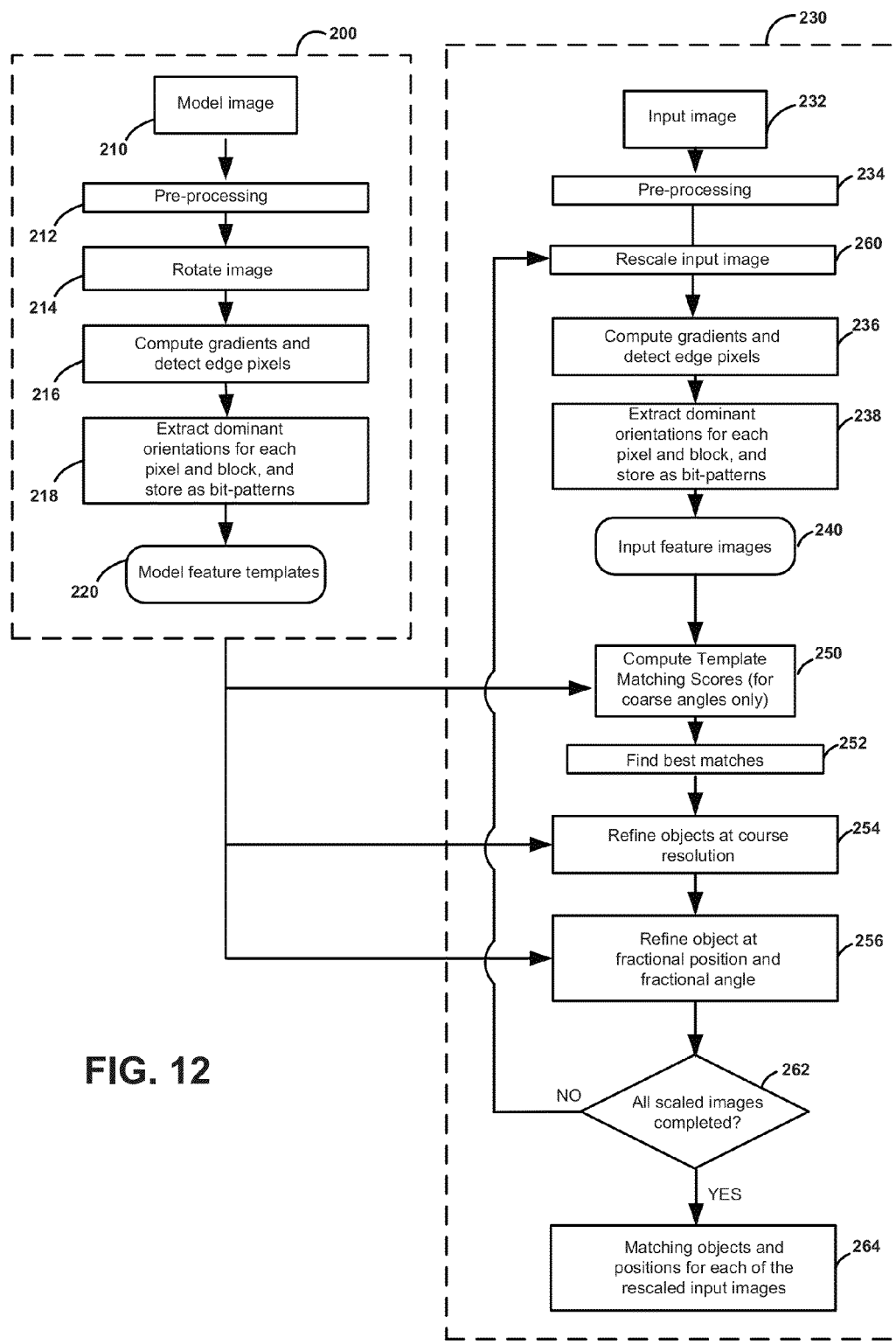
FIG. 12 illustrates an image processing technique for matching that includes scaling.

Referring to FIG. 11, an exemplary model process 200 for a model image 210 and the input image process 230 are shown. The model image 210 may be pre-processed 212 to reduce noise in the image, such as using a low pass filtering operation. The filtered model image 212 may be rotated among a set of orientations, such as by 30 degrees, by a rotation module 214. For each of the set of orientations 214 the system may compute the gradients to identify the edges within the image and determine those pixels of the image corresponding with the edges 216. For each of the set of orientations for which the edges are determined 216, the system may extract the orientations for each pixel and the dominant orientations for blocks of pixels (such as a 4×4 blocks of pixels) and store the result as a set of bytes having suitable bit patterns 218, as previously discussed. In addition, the system may generate a set of full resolution templates at substantially finer angular resolutions, such as rotations of one degree. The result of this process is a set of model feature templates 220.

The exemplary input image process 230 for an input image 232 may include being pre-processed 234 to reduce noise in the image. The system may compute the gradients to identify the edges within the filtered input image and determine those pixels of the image corresponding with the edges 236. For each of the edges that are determined 236, the system may extract 238 the orientations for each pixel and the dominant orientations for blocks of pixels (such as a 4×4 blocks of pixels) and store the result as a set of bytes having suitable bit patterns 240, as previously discussed. The system may likewise compute a full resolution input feature images. The result of this process is input feature images 240.

The system may compute template matching scores 250 between the input feature images 240 and each of the coarse rotations of the model feature templates 220 for different regions of the input image 232. These comparison templates are preferably based upon the byte representation of the respective images, as previously discussed. For example, the system may process the templates centered at each pixel or block of pixels of the input image or otherwise in any other suitable manner. A set of matches 252, preferably those with the highest scores, between the input feature images and the template is determined in any suitable manner.

The result of the matches 252 provides initial candidate locations in the input image that are likely to include an object of interest and also provide rough angular orientations of the objects of interest. The system then refines 254 the angular orientation of each of the objects of interest in the input image by using the course resolution model image at its finer angular resolutions to determine a finer angular estimation. In addition, the system may refine 254 the spatial location of each of the objects of interest in the input image by using the coarse resolution model image at its finer angular resolution. The input feature images may use a higher resolution and/or finer angular resolution, if desired. A set of refined matches between the input feature images and the template is determined in a suitable manner.

The use of a two-stage matching process is computationally more efficient than a one-stage process. The first stage provides a rough estimation of the location of potential objects of interest in the input image, in an efficient manner. The second stage provides a finer estimation of the location of the identified potential objects of interest in the input image, in an efficient manner, by reducing the area of the search and the angular range of the search.

The result of the matching refinement 254 may be provided to a fractional refinement process 256. The fractional refinement process 256 may include an angular search and/or a spatial search using the "full resolution" model image. Also, the fractional refinement process 256 may refine the angular orientation of the objects of interest in the input image by using the "full resolution" model image at angles interpolated in some manner between its finer angular resolutions to determine a fractional angular estimation. In addition, the fractional refinement process 256 may refine the spatial location of the objects of interest in the input image by using the "full resolution" model image at its finer angular resolution and/or fractional angle at positions interpolated in some manner. The input feature images may use a higher resolution and/or finer angular resolution template, if desired. A set of further refined matches 258 is determined in a suitable manner.

The use of a three-stage matching process is computationally more efficient than a one-stage or two-stage process. The first stage provides a rough estimation of the location of potential objects of interest in the input image, in an efficient manner. The second stage provides a finer estimation of the location of the identified potential objects of interest in the input image, in an efficient manner, by reducing the angular range of the search. The third stage provides a reduced spatial and/or angular search together with a sub-angular and/or sub-pixel resolution which provides a finer estimation of the location of the identified potential objects of interest in the input image, in an efficient manner.

In some cases it may be desirable to provide the ability to more accurately match the model image to the objects in the input image having different scales. The model feature templates are preferably determined at a single scale. The input feature images are preferably determined at a plurality of scales, which is more memory efficient than storing the model image at a plurality of scales. The system may rescale 260 the input image 232 to a different scale. Thereafter, a set of templates and object matching is performed on the rescaled input image 260. The system determines if all scaled images are completed 262, which if not, then the system rescales the input image 260 to a different scale. Generally duplicate matches may be omitted, if desired. When the system determines that all scaled images are completed 262, then the system provides the matching objects and positions for each of the rescaled input images 264 which may be mapped back to the input image resolution.

Figure 13:
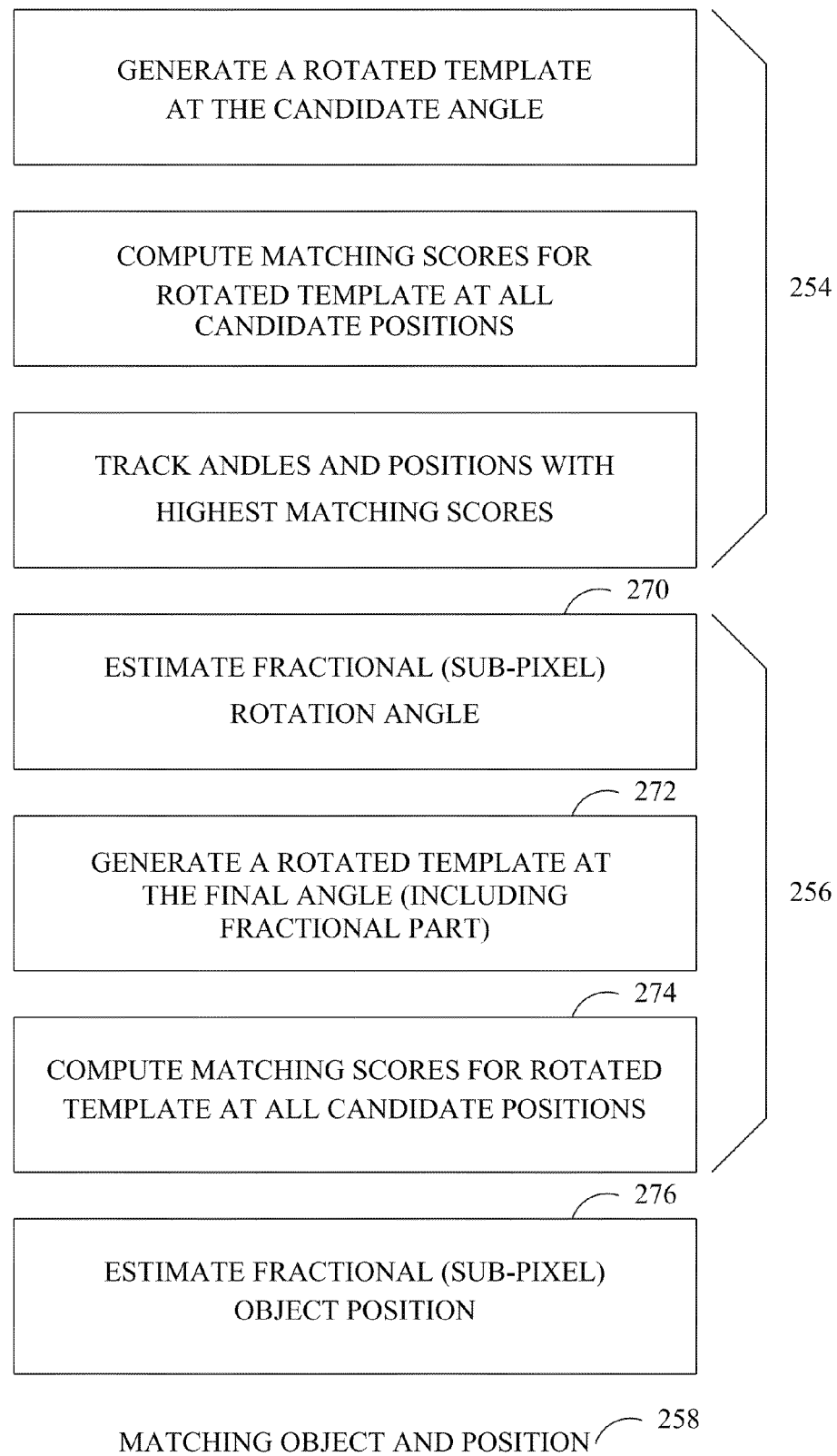
FIG. 13 illustrates a refinement technique for image matching.

Referring to FIG. 13, a more detailed illustration of the refine objects at full resolution process 254 and the refine object at fractional position and fractional angle process 256 are shown. The refine objects at full resolution process 254 may use a set of candidate angles in a local range around the current angle candidate and a set of candidate positions in a local rage around the current position. The angles and positions with the highest matching scores may be tracked. The refine object at fractional position and fractional angle process 256 may estimate a fractional sub-degree rotation angle 270, generate a rotated template at the estimated fractional rotation angle 272, compute matching scores for the rotated template at all candidate positions 274, and estimate fractional sub-pixel object position 276, to provide the object angle and position 258.

Figure 14:
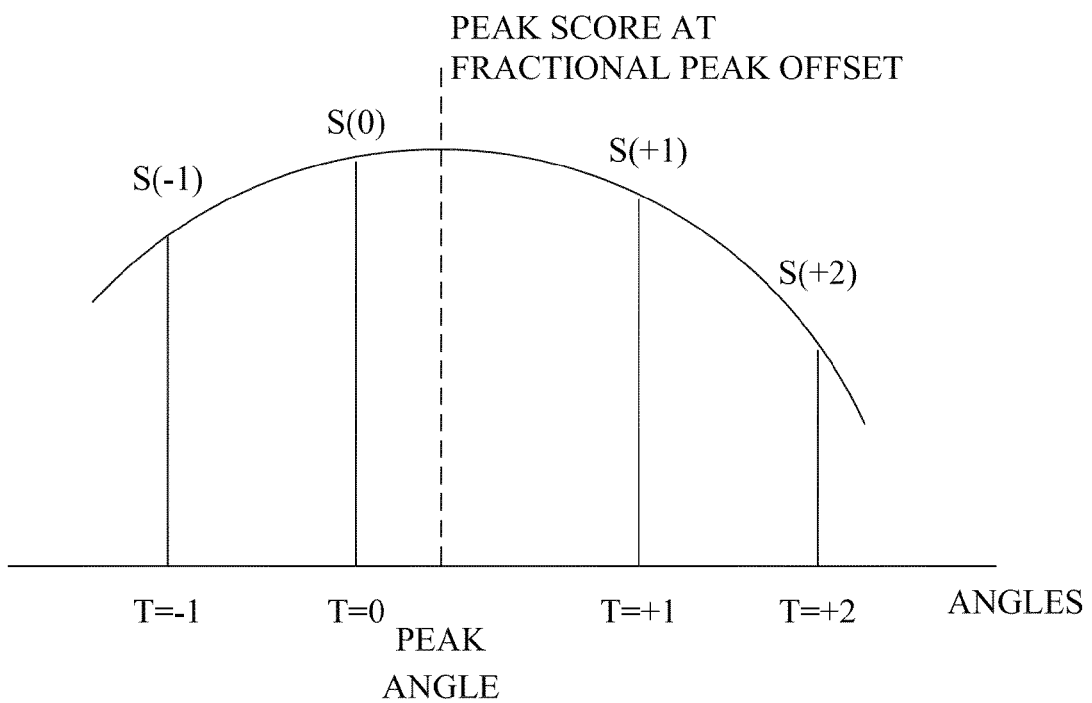
FIG. 14 illustrates a fractional peak offset.

Referring to FIG. 14, one technique for estimating the fractional rotational offset is to assume that the peak score values locally behave as a quadratic function of the rotation angle. The peak scores at a set of discrete angles may be determined (e.g., s(−1), s(0), s(1)). The peak score may be estimated as $\{s(-1)-s(1)\}/2\{s(-1)+s(1)-2*s(0)\}$.

The sub-pixel refinement 256 may be performed in any suitable manner. Often the input to the sub-pixel refinement 256 is a score at each pixel and the location of a peak value. Thus the refinement technique may be based on a local score map around the coarse peak point.

A Barycentric weighting technique may use the score map values to weight each pixel in the local window to obtain the centroid of the neighborhood around the peak value. The Barycentric weighting technique is computationally efficient although tends to be limited to a linear fitting. This may be represented as:

$$x_c = \frac{\Sigma_i(x_i s_i)}{\Sigma_i x_i}$$

$$y_c = \frac{\Sigma_i(y_i s_i)}{\Sigma_i y_i}$$

A quadratic curve fitting technique fits a bi-quadratic curve to the pixels in the local window around the peak points. This uses a second order fitting which includes a least squares estimation of the error and produces two sets of three coefficients that may be used to reconstruct the curve and find the maximum. This fitting process may be improved by solving the linear equation sets by Hessian matrix and first order derivative. The result is the sub-pixel offset of the maximal point. Without lose of generality, the coarse peak point may be located at (0,0), which is the center of the local window of the score used for refinement. The model for the refinement may be:

$$f(x, y) = ax^2 + by^2 + cxy + dx + ey + g$$

Where $$\frac{a^2 f}{a^2 x} = a \quad \frac{af}{ax} = 2ax + cy + d$$

$$\frac{a^2 f}{a^2 y} = b \quad \frac{af}{ay} = 2by + cx + e$$

The first order of x and y should be 0 at the peak point, then the equation set as follows as:

$$\begin{bmatrix} 2a & c \\ c & 2b \end{bmatrix} \begin{bmatrix} x \\ y \end{bmatrix} = -\begin{bmatrix} d \\ e \end{bmatrix}$$

The system may use the first and second derivative at the coarse peak point to approximate the coefficients a, b, c, d, and e to get the solution of x and y, which is the sub-pixel shift.

A Gaussian fitting technique may be used, such as using a two dimensional Gaussian plane model. The data in the score map is presumed to have a normal distribution. The system may use the first and second derivative at the coarse peak point to approximate the coefficients a, b, c, d, and e to get the solution of x and y, which is the sub-pixel shift. The Gaussian fitting may be represented as:

$$G(x, y) = \frac{1}{2\pi\sigma_x\sigma_y} g^{-\left(\frac{(x-\mu_x)^2}{2\sigma_x^2}\right)+\left(\frac{(y-\mu_y)^2}{2\sigma_y^2}\right)}$$

The fitting objective is to find the proper $\sigma_x$, $\sigma_y$, $\mu_x$, $\mu_y$ to estimate the non-grid value. The $\mu_x$, $\mu_y$ are the results for Gaussian sub-pixel refinement. The fit procedure may use the Levenberg-Marquardt optimization technique for the local window.

The feature matching techniques of the system may be improved by identifying particular regions of the image that should be searched and/or otherwise particular regions of the image that should not be searched. The coarse searching requires a significant amount of computational time and a more computationally efficient initial matching criteria may be used to decrease the processing time of the subsequent coarse matching technique.

Figure 15:
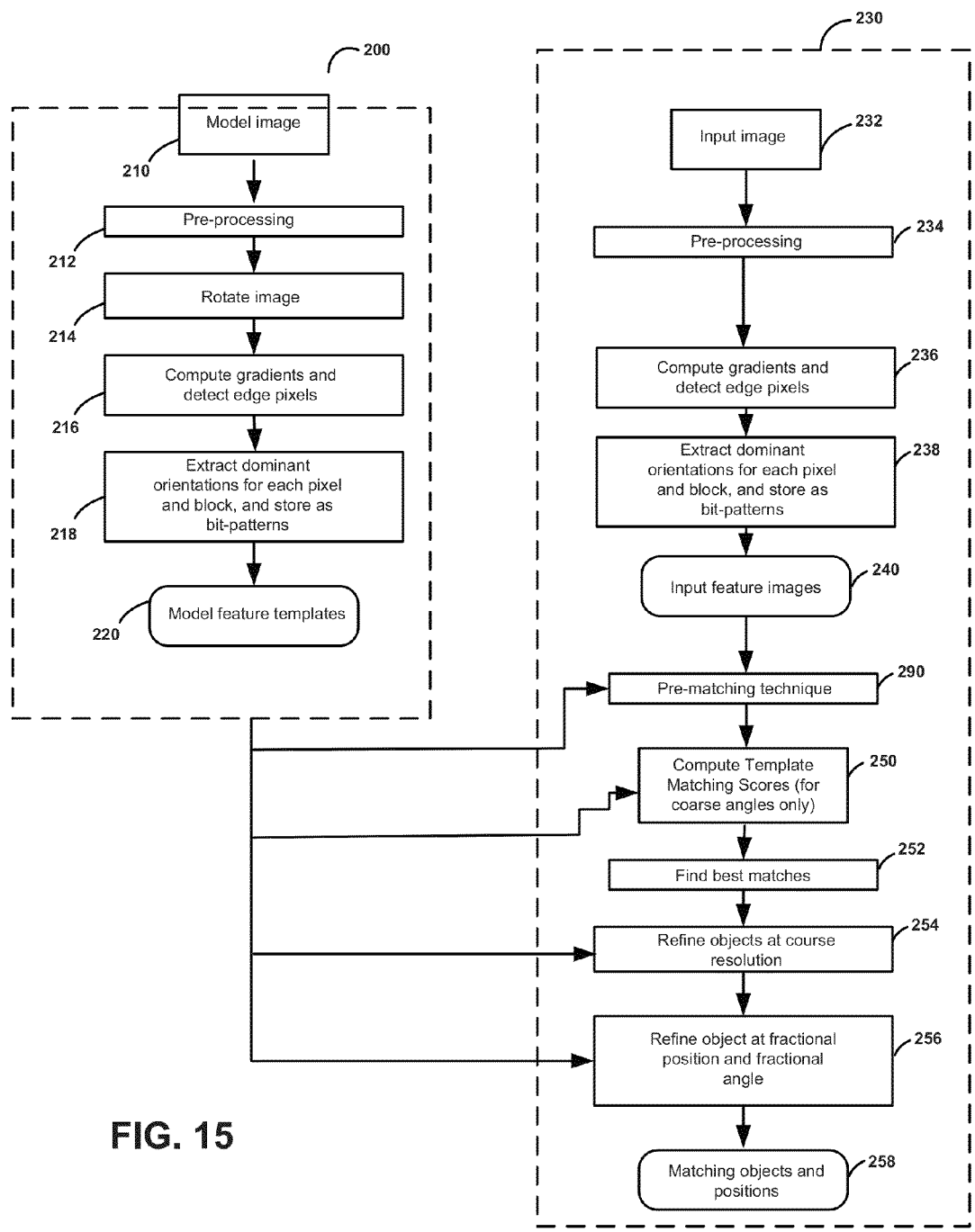
FIG. 15 illustrates an image processing technique for matching that includes pre-filtering.

Referring to FIG. 15, a pre-matching technique 290 may use those pixels identified as edge pixels to do an initial screening of areas of the input image. Pixels not identified as being part of an edge may be omitted as not being likely to be an object in the input image. Thus, the system primarily only performs a matching on the non-zero edge pixels. Thus, the matching technique may indicate candidate positions that are very unlikely to result in a good match, and thus may be skipped. Accordingly, positions that are likely to result in at least a reasonable match are considered in the coarse search stage. The pre-matching technique 290 may determine if the number of edge pixels in the model template is relatively close to the number of edge pixels within the potential object area in the input image. Due to the likelihood of some occlusions or partial objects, the input edge pixel count may at times tend to be smaller than the model edge pixel count. Accordingly, one suitable criteria could for the pre-matching technique 290 is as follows: input edge pixel count>=model edge pixel count*ratio. As it may be appreciated, the edge pixel count is a feature that is computationally efficient to determine and tends to be rotationally invariant. The result is a mask image that defines those regions that meet the pre-matching technique 290 criteria, thus reducing those regions of the image that should be matched during subsequent more computationally intensive processing.

In some cases, it may be more computationally efficient to perform the matching techniques at multiple down sampled resolutions. For example, the matching may be performed at image resolutions down sampled initially at a 4×4 block resolution. A threshold may be applied to the result to further reduce the regions to be searched. Then those areas of potential matching the matching may be performed at image resolutions down sampled at 2×2 block resolutions. Also, a threshold may be applied to the result to further reduce the regions to be searched. In this manner, the coarse template matching may be performed in a computationally efficient manner. Downsampling the feature image may be performed very efficiently using bitwise operations. For example, the bitwise OR operation may be used to combine bit patterns corresponding to feature values of pixels in a 2×2 area.

In some cases, it is desirable to use a modified set of angular orientations for the search, rather than, 0 degrees, 30 degrees, 60 degrees, 90 degrees, 120 degrees, and/or 150 degrees. The selected spacing between the different orientations is preferably sufficiently small enough that the search technique does not miss a match, but likewise sufficiently large enough to make the matching technique computationally efficient. This determination may be based upon an auto-correlation between the original template and the rotated templates. The coarse angle search step may be selected based on the width of the main peak in the auto-correlation function. Computing and analyzing the rotational auto-correlation of the templates may be performed during an off-line stage. This enables adaptation of the angle search step to the specific object, such that the processing time is reduced for various objects.

Figure 16:
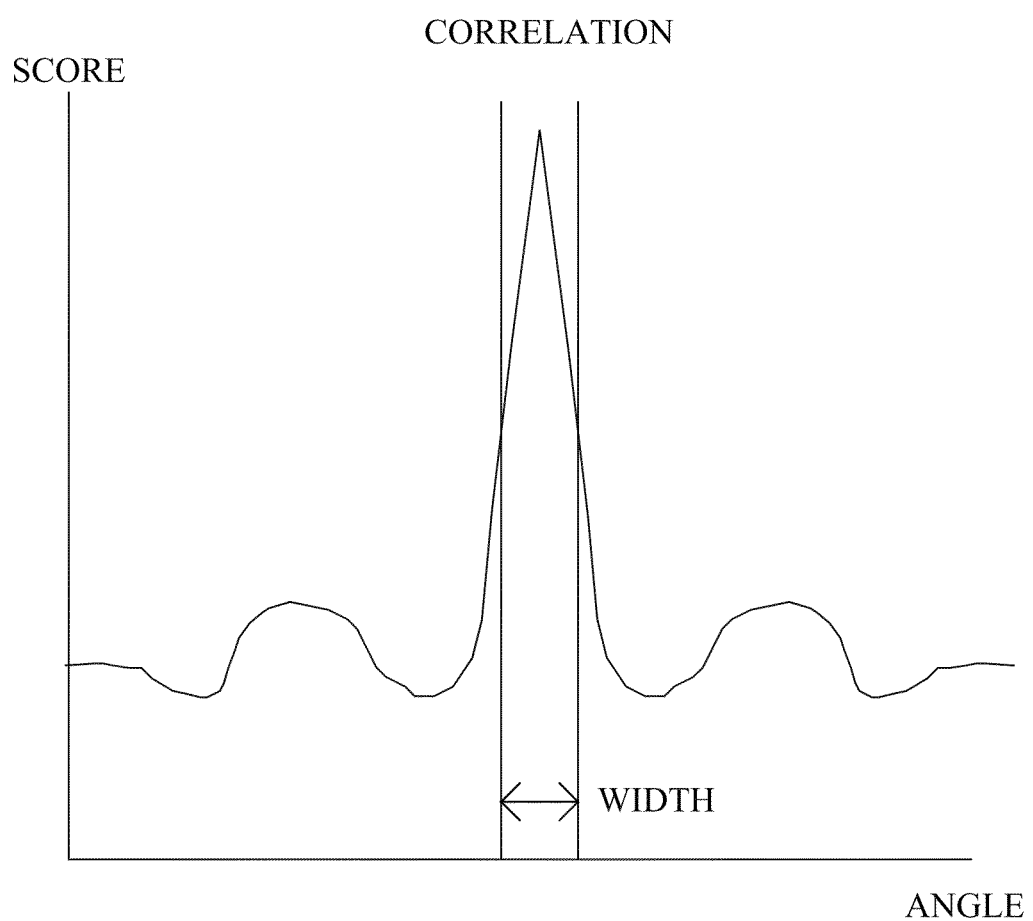
FIG. 16 illustrates a correction of different angles together with a threshold.

Referring to FIG. 16, an exemplary correlation graph is shown as a function of angular degree. It may be observed by selecting a sufficiently small range ensures that the peak will be determined. In contrast, if a sufficiently large range is selected then one or more of the minor peaks may be inadvertently selected.

In many cases, model images have sufficient symmetry that the system should employ a technique that only searches a range of approximately 180 degrees. The model image may be analyzed to determine if it is sufficiently symmetrical in some manner to be suitable for using a symmetrical technique. In the event the model image is not symmetrical, then a technique using generally a full 360 degree search range may be used. The analysis of symmetry of the object in the model image may be based on the auto-correlation of the model template. This analysis may be performed in an off-line stage. Searching a range of approximately 180 degrees during the coarse template matching stage reduces processing time, compared to searching a full range of 360 degrees. In some cases, the analysis may indicate that an object has more symmetry, such as 3 or 4 fold symmetry. In such cases, the search range may be reduced further below 180 degrees.

In some cases it is desirable to do a coarse matching technique followed by a refined matching technique. Then it is desirable to perform another refined matching technique in the opposite direction, such as at 180 degrees from the results of the first matching technique. Thereafter, the orientation with the better matching may be used for the sub-pixel sub-angular further matching refinement. For example, in the case that a reduced angular search is performed in a range of approximately 180 degrees instead of 360 degrees, it is desirable to perform an additional refinement stage in a small angle range around the angle 180 degrees opposite of the first refinement result.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for image processing comprising:
   (a) determining edge pixels of a model image using an edge based technique;
   (b) determining an angular orientation for each said edge pixels of said model image;
   (c) determining a lower spatial resolution model image based upon said model image and determining respective angular orientations for said lower spatial resolution model image;
   (d) determining edge pixels of an input image using an edge based technique;
   (e) determining an angular orientation for each of said edge pixels of said input image;
   (f) determining a lower spatial resolution input image based upon said input image and determining respective angular orientations for said lower spatial resolution input image;
   (g) matching said lower spatial resolution model image with said lower spatial resolution input image to determine candidate locations of an object within said input image;
   (h) based upon said candidate locations matching said input image with said model image;
   (i) wherein said image processing further includes at least one of:
       wherein said matching is performed at a plurality of different scales without storing additional model images;
       wherein results of said matching are further utilized to determine a fractional pixel object position of said model image and to determine a fractional object rotation angle of said model image;
       wherein said matching skips candidate positions of said input image based upon a previous filtering of said input image to determine areas of said input image that contain a sufficient number of edge pixels;
       wherein said matching is also based upon searching a limited range of angles based upon objects identified in said model image having rotational symmetry;
       wherein said matching is also based upon searching a set of angles determined by adaptively selecting an angle sampling interval based upon an object of said model image;
       wherein said matching is also based upon searching a set of angles determined by analyzing auto-correlation of said model image across rotation angles;
       wherein said matching of said lower spatial resolution model image and said low spatial resolution input image is based upon both a position search and an angle search, and further including at least one refinement stage matching a higher spatial resolution model image and a higher spatial resolution input image based upon both a higher resolution position search and a higher resolution angle search.

2. The method of claim 1 wherein said edge based technique includes a gradient.

3. The method of claim 1 wherein said angular orientations of said lower resolution model images are directionally invariant.

4. The method of claim 1 wherein said angular resolution of said lower spatial resolution model image includes a plurality of orientations not aligned with either a vertical and a horizontal axis of said model image.

5. The method of claim 1 wherein said matching is performed at said plurality of different scales without said storing additional model images.

6. The method of claim 1 further including said filtering of said input image to determine regions of said image that are to be omitting from said matching.

7. The method of claim 1 wherein said angular orientations for said lower spatial resolution model image are adaptively selected.

8. The method of claim 1 wherein said matching skips candidate positions of said input image based upon said previous filtering of said input image to determine areas of said input image that contain said sufficient number of edge pixels.

9. The method of claim 1 wherein results of said matching are further utilized to determine said fractional pixel object position of said model image and to determine said fractional object rotation angle of said model image.

10. The method of claim 1 wherein said matching is said also based upon searching said limited range of angles based upon objects identified in said model image having said rotational symmetry.

11. The method of claim 1 wherein said matching is also based upon searching said set of angles determined by said adaptively selecting said angle sampling interval based upon said object of said model image.

12. The method of claim 1 wherein said matching is also based upon searching said set of angles determined by analyzing auto-correlation of said model image across rotation angles.

13. The method of claim 1 wherein said matching of said lower spatial resolution model image and said low spatial resolution input image is based upon both said position search and said angle search, and further including said at least one refinement stage matching said higher spatial resolution model image and said higher spatial resolution input image based upon both said higher resolution position search and said higher resolution angle search.

14. The method of claim 1 wherein said angular orientation of said edge pixels of said model image is defined in a range less than 360 degrees.

15. The method of claim 14 wherein said range is generally 180 degrees.

16. The method of claim 1 wherein said lower spatial resolution model image has a lower angular resolution than the angular resolution of said edge pixels of said model image.

17. The method of claim 16 wherein said lower spatial resolution model image is based upon combining groups of pixels of said model image, and each of said groups of pixels has an orientation based upon a ranked order of corresponding said edge pixels of said model image.

18. The method of claim 17 wherein said orientation of each of said group of pixels is represented by a byte.

19. The method of claim 18 wherein said orientation of each of said group of pixels is represented by a bit of said byte.

20. The method of claim 19 wherein said orientation of each of said group of pixels includes a plurality of orientations.

21. The method of claim 20 wherein each of said plurality of orientations is represented by a bit of said byte.

* * * * *